(12) United States Patent
Geskes et al.

(10) Patent No.: US 9,051,852 B2
(45) Date of Patent: Jun. 9, 2015

(54) SYSTEM FOR UTILIZING WASTE HEAT OF AN INTERNAL COMBUSTION ENGINE

(71) Applicant: Behr GmbH & Co. KG, Stuttgart (DE)

(72) Inventors: Peter Geskes, Ostfildern (DE); Klaus Irmler, Tuebingen (DE); Michael Schmidt, Bietigheim-Bissingen (DE); Arthur Strehlau, Korntal-Muenchingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 144 days.

(21) Appl. No.: 13/740,600

(22) Filed: Jan. 14, 2013

(65) Prior Publication Data

US 2013/0125545 A1 May 23, 2013

Related U.S. Application Data

(63) Continuation of application No. PCT/EP2011/061554, filed on Jul. 7, 2011.

(30) Foreign Application Priority Data

Jul. 13, 2010 (DE) .......................... 10 2010 027 068

(51) Int. Cl.
*F01K 23/10* (2006.01)
*F01B 29/10* (2006.01)
(Continued)

(52) U.S. Cl.
CPC ............... *F01K 23/065* (2013.01); *F02G 5/02* (2013.01); *F28D 7/1607* (2013.01); *F28D 7/1692* (2013.01); *F28D 21/0003* (2013.01); *Y02T 10/166* (2013.01)

(58) Field of Classification Search
CPC ....... F01K 23/065; F01K 25/08; F01K 25/10; F01K 15/02; F01N 2240/02; F01N 5/02; F02B 37/00; F02B 37/10; F02B 3/06; F02G 5/02; F28D 21/0003; F02M 25/0731; Y02T 10/144; Y02T 10/166

USPC ................. 60/608, 645, 651, 670, 671, 517, 60/614–618; 62/99, 498; 123/540; 180/69.6
See application file for complete search history.

(56) References Cited

U.S. PATENT DOCUMENTS

| 4,334,409 A | 6/1982 | Daugas |
| 6,119,457 A | 9/2000 | Kawamura |

(Continued)

FOREIGN PATENT DOCUMENTS

| CH | 669977 A5 * | 12/1978 | .............. F02B 61/04 |
| EP | 0869275 A1 * | 7/1998 | ............. F02M 25/07 |

(Continued)

*Primary Examiner* — Christopher Jetton
*Assistant Examiner* — Daniel Wagnitz
(74) *Attorney, Agent, or Firm* — Muncy, Geissler, Olds & Lowe, P.C.

(57) ABSTRACT

A system for utilizing waste heat of an internal combustion engine via the Clausius-Rankine cycle process is provided that includes a circuit with lines containing a working medium, an evaporator heat exchanger which serves for evaporating the liquid working medium using waste heat of the internal combustion engine and which has an inlet opening for conducting the working medium into a flow duct and an outlet opening for conducting the working medium out of the flow duct, and the flow duct is divided into a plurality of flow duct parts connected hydraulically in parallel, an expansion machine, a condenser for liquefying the vaporous working medium, a collecting and compensating vessel for the liquid working medium, it is sought to be able to change the working medium substantially completely from a liquid state of aggregation to a gaseous state of aggregation at an evaporator heat exchanger.

13 Claims, 5 Drawing Sheets

(51) Int. Cl.
*F02G 1/04* (2006.01)
*F02G 3/00* (2006.01)
*F01K 23/06* (2006.01)
*F02G 5/02* (2006.01)
*F28D 7/16* (2006.01)
*F28D 21/00* (2006.01)

(56) References Cited

U.S. PATENT DOCUMENTS

| | | | |
|---|---|---|---|
| 6,523,606 B1 | 2/2003 | Dienhart et al. | |
| 2002/0062651 A1* | 5/2002 | Klingler | 62/99 |
| 2004/0237576 A1* | 12/2004 | Sasaki et al. | 62/498 |
| 2004/0250544 A1* | 12/2004 | Minemi et al. | 60/670 |
| 2005/0167173 A1* | 8/2005 | Hoetger et al. | 180/69.6 |
| 2005/0262842 A1* | 12/2005 | Claassen et al. | 60/618 |
| 2009/0126918 A1 | 5/2009 | Campagna et al. | |
| 2009/0277606 A1 | 11/2009 | Reiss, III et al. | |
| 2010/0018207 A1* | 1/2010 | Juchymenko | 60/670 |
| 2010/0139626 A1* | 6/2010 | Raab et al. | 123/540 |
| 2011/0167818 A1* | 7/2011 | Tsuchino et al. | 60/618 |
| 2011/0167823 A1* | 7/2011 | Berger et al. | 60/645 |
| 2012/0060502 A1* | 3/2012 | Gartner et al. | 60/670 |

FOREIGN PATENT DOCUMENTS

| | | | |
|---|---|---|---|
| EP | 1 669 568 A1 | 6/2006 | |
| EP | 2180171 A1 * | 4/2010 | F02G 5/02 |
| WO | WO 2007/115579 A2 | 10/2007 | |

* cited by examiner

SYSTEM FOR UTILIZING WASTE HEAT OF AN INTERNAL COMBUSTION ENGINE

This nonprovisional application is a continuation of International Application No. PCT/EP2011/061554, which was filed on Jul. 7, 2011, and which claims priority to German Patent Application No. DE 10 2010 027 068.7, which was filed in Germany on Jul. 13, 2010, and which are both herein incorporated by reference.

BACKGROUND OF THE INVENTION

1. Field of the Invention

The invention relates to a system for utilizing the waste heat of an internal combustion engine via the Clausius-Rankine cycle process, a method for operating a system for utilizing the waste heat of an internal combustion engine via the Clausius-Rankine cycle process, and an internal combustion engine with a system for utilizing the waste heat of the internal combustion engine via the Clausius-Rankine cycle process.

2. Description of the Background Art

Internal combustion engines are used in various technical applications for converting thermal energy into mechanical energy. In motor vehicles, especially in trucks, internal combustion engines are used to move the motor vehicle. The efficiency of internal combustion engines can be increased by the use of systems for utilizing the waste heat of the internal combustion engine by means of the Clausius-Rankine cycle process. In this process, the system converts the waste heat of the internal combustion engine into mechanical energy. The system comprises a circuit having lines with a working medium, e.g., water, a pump for conveying the working medium, an evaporator heat exchanger for vaporizing the liquid working medium, an expander, a condenser for liquefying the vaporous working medium, and a collecting and equalizing tank for the liquid working medium. The overall efficiency of the internal combustion engine can be increased by the use of this type of system in an internal combustion engine, in the case of an internal combustion engine having this type of system as a component of the internal combustion engine.

In the evaporator heat exchanger, the working medium, for example, water, is vaporized by the waste heat of the internal combustion engine and then the vaporized working medium is supplied to the expander, where the gaseous working medium expands and performs mechanical work by means of the expander. In the evaporator heat exchanger, for example, the working medium is conveyed through a flow duct and exhaust gas of the internal combustion engine through an exhaust gas flow duct. As a result, the heat of the exhaust gas with a temperature in the range of, for example, between 400° and 600° C. is transferred to the working medium in the evaporator heat exchanger and, as a result, the working medium is converted from the liquid state to the vapor state.

There are two optimization criteria for the performance of the evaporator heat exchanger. On the one hand, the pressure loss should be as minimal as possible; i.e., the evaporator heat exchanger should cause as low a pressure loss as possible during the conveying of the working medium. This means that there should be if possible no deflections or internal structures to be able to provide as low a pressure loss as possible in the flow duct and a plurality of flow duct parts connected hydraulically in parallel. It should be considered in this regard that with the vaporizing of the working medium and the associated change in the physical state, the flow velocity increases greatly and thereby the pressure loss increases. A second optimization criterion is the thermal efficiency, i.e., the best possible heat transfer from the exhaust gas to the working medium. If the evaporator heat exchanger is designed, for example, as a plate heat exchanger or with a stacked plate structure, the working medium flows through a flow duct through the fluid ducts forming between the plates and the exhaust gas through the exhaust gas flow duct. In this case, a flow duct part for conveying working media and an exhaust gas flow duct as an exhaust gas flow duct part for conveying the exhaust gas form alternately on the plates, stacked one above the other, of the evaporator heater exchanger. In this case, the flow duct parts are connected in parallel; i.e., downstream of an inlet opening for the working medium in the evaporator heat exchanger, the entire working medium is first introduced into a flow duct and the working medium flows from the flow duct into a plurality of flow duct parts, connected hydraulically in parallel, and then after flowing out of the flow duct parts connected in parallel, the working medium again flows into a flow duct and from the flow duct the working medium again leaves the evaporator heat exchanger through an outlet opening.

The exhaust gas conveyed through the exhaust gas flow duct or the exhaust gas flow duct parts may have a nonuniform flow distribution; in other words, substantially less exhaust gas is conveyed per unit time in the individual exhaust gas flow duct parts than through other exhaust gas flow duct parts. This can have the result that the working medium is vaporized even earlier in individual flow duct parts, through which the working medium is conveyed, than in other flow duct parts. The earlier vaporizing of the working medium and the associated change in the physical state from liquid to gaseous lead to an intensification of the effect of unequal distribution, because the pressure loss also increases with the change in the physical state due to the higher flow velocity of the working medium and this results in an additional reduction in volume flow in the flow duct parts with an earlier vaporization. This can have the result that because of the high volume flow in the flow duct parts with a later vaporization, the working medium leaves the flow duct part in a liquid state and in other flow duct parts the working medium leaves the flow duct part as a gas. As a result, a mixture of liquid and gaseous working medium can emerge at the outlet opening of the evaporator heat exchanger; this is disadvantageous for the overall coverage of the system and in particular can also cause damage in the expander.

WO 2009/089885 A1 shows a device for exchanging heat between a first and a second medium, with plate pairs stacked one on top of another in a stacking direction, whereby a first flow space, through which a first medium can flow, is formed between the two plates of at least one plate pair and a second flow space, through which a second medium can flow, between two plate pairs, adjacent to one another, whereby the first flow space has a first flow path for the first medium with flow path sections which can be flown through one after the other in opposite directions, said sections being separated from one another by a partition wall arranged between the at least two plates of the at least one plate pair.

SUMMARY OF THE INVENTION

It is therefore an object of the present invention to provide a system for utilizing the waste heat of an internal combustion engine by means of the Clausius-Rankine cycle process, a method for operating a system for utilizing the waste heat of an internal combustion engine by means of the Clausius-Rankine cycle process, and an internal combustion engine with a system for utilizing the waste heat of the internal combustion engine by means of the Clausius-Rankine cycle process, in which the working medium can be changed substantially completely from a liquid to a gaseous state in an evaporator heat exchanger.

In an embodiment, the object is attained with a system for utilizing the waste heat of an internal combustion engine by means of the Clausius-Rankine cycle process, comprising a circuit having lines with a working medium, particularly water, a pump for conveying the working medium, an evaporator heat exchanger for vaporizing the liquid working medium with the waste heat of the internal combustion engine with an inlet opening for conveying the working medium into a flow duct and an outlet opening for conveying the working medium out of the flow duct, and the flow duct is divided into a plurality of flow duct parts, connected hydraulically in parallel, an expander, a condenser for liquefying the vaporous working medium, and preferably a collecting and equalizing tank for the liquid working medium, whereby the evaporator heat exchanger has a mixing duct and in the flow direction of the working medium at least two flow duct parts, connected hydraulically in parallel, open into the mixing duct and in the flow direction of the working medium the mixing duct opens into at least two flow duct parts, connected hydraulically in parallel.

In the evaporator heat exchanger, the working medium, e.g., water, is conveyed through a plurality of flow duct parts connected in parallel. In this case, a different heating of the working medium can occur in the flow duct parts, connected hydraulically in parallel, due to the different volume flows at which the exhaust gas flows through the exhaust gas flow duct parts. This leads to different heating of the working medium in the flow duct parts and, as a result, the working medium can emerge from individual flow duct parts in the liquid state and from other flow duct parts in the gaseous state. A change in the physical state from liquid to gaseous additionally increases the pressure loss in the flow duct part(s), in which the working medium has changed to the gaseous state, so that as a result this effect is still further increased, because as a result more working medium flows in the flow duct part(s), in which the working medium is still completely in the liquid state.

Because of the present mixing duct, the working medium first flows through the evaporator heat exchanger through at least two flow duct parts, connected in parallel, as a parallel region, then the working medium conveyed out of these at least two flow duct parts, connected in parallel, is again supplied totally to the mixing duct as a flow space for the working medium, conveyed through the at least two flow duct parts connected in parallel, and mixed there and then again supplied to the at least two hydraulically connected flow duct parts as an additional parallel region for heating and vaporizing of the working medium. As a result, nonuniformities in the temperature distribution or vaporizing between the parallel-connected flow duct parts can be equalized, because after the emergence from the first parallel region the working medium is again mixed in the mixing duct and thereby a substantially homogeneous temperature distribution can again be achieved and the working medium is then supplied to the second parallel region and there heated further and vaporized. As a result, substantially or exclusively vaporous working medium can be conveyed in an advantageous manner from the evaporator heat exchanger, because differences in the heating or vaporizing in the parallel-connected flow duct parts can be reduced due to the mixing in the mixing duct.

The evaporator heat exchanger in an embodiment has at least two mixing ducts, and in each case at least two flow duct parts, connected hydraulically in parallel, are arranged in the flow direction of the working medium hydraulically between the at least two mixing ducts hydraulically in series to the at least one mixing duct. The evaporator heat exchanger can also have a plurality of mixing ducts, e.g., two, three, or four mixing ducts, each with parallel regions present in the flow direction downstream and upstream of the mixing ducts with at least two flow duct parts connected hydraulically in parallel. As a result, the effect of the uniform temperature distribution and the uniform heating and vaporizing of the working medium in the evaporator heat exchanger can be improved further and thereby a still more uniform heating of the working medium can be achieved, so that emergence of the working medium in the liquid state from the evaporator heat exchanger is substantially ruled out.

In another embodiment, the evaporator heat exchanger has at least one parallel region with at least two flow duct parts connected hydraulically in parallel. A parallel region is thereby understood to be a section or region of the evaporator heat exchanger that has at least two flow duct parts, connected hydraulically in parallel, for conveying the working medium to be vaporized.

In a further embodiment, the at least one parallel region has at least 2, 5, 10, 20, or 30 flow duct parts connected hydraulically in parallel.

The evaporator heat exchanger comprises a plurality of separate units and at least one, preferably only one, parallel region is arranged in each unit and the units are interconnected hydraulically to the mixing duct The evaporator heat exchanger can therefore have a plurality of separate units, preferably with a separate housing, and there is a parallel region with a plurality of flow duct parts, connected hydraulically in parallel, in these separate units. Each unit has an inlet and outlet opening for supplying and discharging the working medium and the individual units in this case are connected in series. If the evaporator heat exchanger has, for example, two units, after the conveying of the working medium out of the first unit, the working medium is conveyed through a mixing duct, which is made here particularly as a mixing tube, to the second unit and thereby during the conveying of the working medium from the first to the second unit the working medium is mixed in the mixing duct or the mixing tube and then the conveying occurs in the second unit again through at least two flow duct parts connected hydraulically in parallel.

In a variant, the evaporator heat exchanger comprises only one unit and at least two parallel regions are arranged in the unit. The two parallel regions of the evaporator heat exchanger can also be designed in an evaporator heat exchanger with only one unit. Preferably, therefore, the evaporator heat exchanger comprises only one housing and at least two parallel regions are formed within the housing.

Expediently, the evaporator heat exchanger comprises at least one exhaust gas flow duct, preferably a plurality of exhaust gas flow duct parts, for conveying the exhaust gas to give off the heat from the exhaust gas to the working medium and/or the evaporator heat exchanger is a plate heat exchanger, a spiral heat exchanger, a shell and tube heat exchanger, or a double-pipe heat exchanger, and/or the system can perform a process described in this industrial property application. The exhaust gas can either flow around the evaporator heat exchanger or the evaporator heat exchanger has at least one exhaust gas flow duct for conveying the exhaust gas. In a design of the evaporator heat exchanger as a plate heat exchanger, the working medium is conveyed by plates, stacked one above the other, of the evaporator heat exchanger alternately through the duct parts, which form between the plates, and the exhaust gas is conveyed in a following duct part for the exhaust gas. Preferably, in another embodiment, the exhaust gas and working medium are guided in counterflow.

The method of the invention for operating a system for utilizing the waste heat of an internal combustion engine by means of the Clausius-Rankine cycle process, particularly a system described in this industrial property application, comprises the steps: conveying a working medium in a circuit through lines by means of a pump, vaporizing the working medium in an evaporator heat exchanger with the waste heat of the internal combustion engine, expanding the working medium in an expander and performing mechanical work, liquefying the vaporous working medium in a condenser, whereby the working medium is conveyed into the evaporator heat exchanger and flows through a flow duct, is conveyed hydraulically downstream of the flow duct into at least two flow duct parts as a parallel region, and is conveyed hydraulically in parallel through the at least two flow duct parts, is conveyed hydraulically downstream of the at least two flow duct parts into a mixing duct, and the working medium, conveyed out of the at least two flow duct parts, is mixed in the mixing duct, and hydraulically downstream of the mixing duct the working medium is conveyed into at least two flow duct parts as a parallel region and is conveyed hydraulically in parallel through the at least two flow duct parts, and is conveyed hydraulically downstream of the at least two flow duct parts into the flow duct.

In another embodiment, the working medium is conveyed through at least 3 parallel regions and conveyed hydraulically between the at least 3 parallel regions through a mixing duct in each case and mixed, so that the working medium is conveyed through at least 2 mixing ducts and mixed.

The exhaust gas is conveyed to the at least one parallel region and thereby heat is transferred from the exhaust gas to the working medium and preferably the exhaust gas is conveyed in the at least one parallel region through at least one exhaust gas flow duct, preferably a plurality of exhaust gas flow duct parts.

In another embodiment, the expander is a turbine or a reciprocating piston engine.

In another embodiment, the system comprises a recuperator, by means of which heat can be transferred from the working medium after flowing through the expander to the working medium upstream of the evaporator.

In an additional variant, the evaporator heat exchanger is formed at least in part, particularly completely, of stainless steel, because the working medium is conveyed through the evaporator heat exchanger at a high pressure, e.g., in the range between 40 to 80 bar, and the exhaust gas at a high temperature, e.g., in the range of about 600° C.

An internal combustion engine of the invention, particularly an internal combustion reciprocating piston engine, with a system for utilizing the waste heat of the internal combustion engine by means of the Clausius-Rankine cycle process, comprises a circuit having lines with a working medium, particularly water, a pump for conveying the working medium, an evaporator that can be heated by the waste heat of the internal combustion engine for vaporizing the liquid working medium, an expander, a condenser for liquefying the vaporous working medium, preferably a collecting and equalizing tank for the liquid working medium, whereby the system is designed as a system described in this industrial property application and/or a method described in this industrial property application can be carried out.

In another embodiment, the waste heat of the main exhaust gas flow of the internal combustion engine and/or the waste heat of the exhaust gas recirculation [EGR] and/or the waste heat of the compressed charge air and/or the heat of a coolant of the internal combustion engine can be utilized by the system as a component of the internal combustion engine. Thus, the waste heat of the internal combustion engine is converted to mechanical energy by the system and thereby the efficiency of the internal combustion engine is increased in an advantageous manner.

In another embodiment, the system comprises a generator. The generator can be driven by the expander, so that the system can thereby provide electrical energy or electric current.

In another embodiment, water as a pure substance, R245fa, ethanol (pure substance or mixture of ethanol with water), methanol (pure substance or mixture of methanol and water) longer-chain alcohols C5 to C10, longer-chain hydrocarbons C5 (pentane) to C8 (octane), pyridine (pure substance or mixture of pyridine with water), methylpyridine (pure substance or mixture of methylpyridine with water), trifluoroethanol (pure substance or mixture of trifluoroethanol with water), hexafluorobenzene, a water/ammonia solution, and/or a water-ammonia mixture are employed as the working medium of the system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
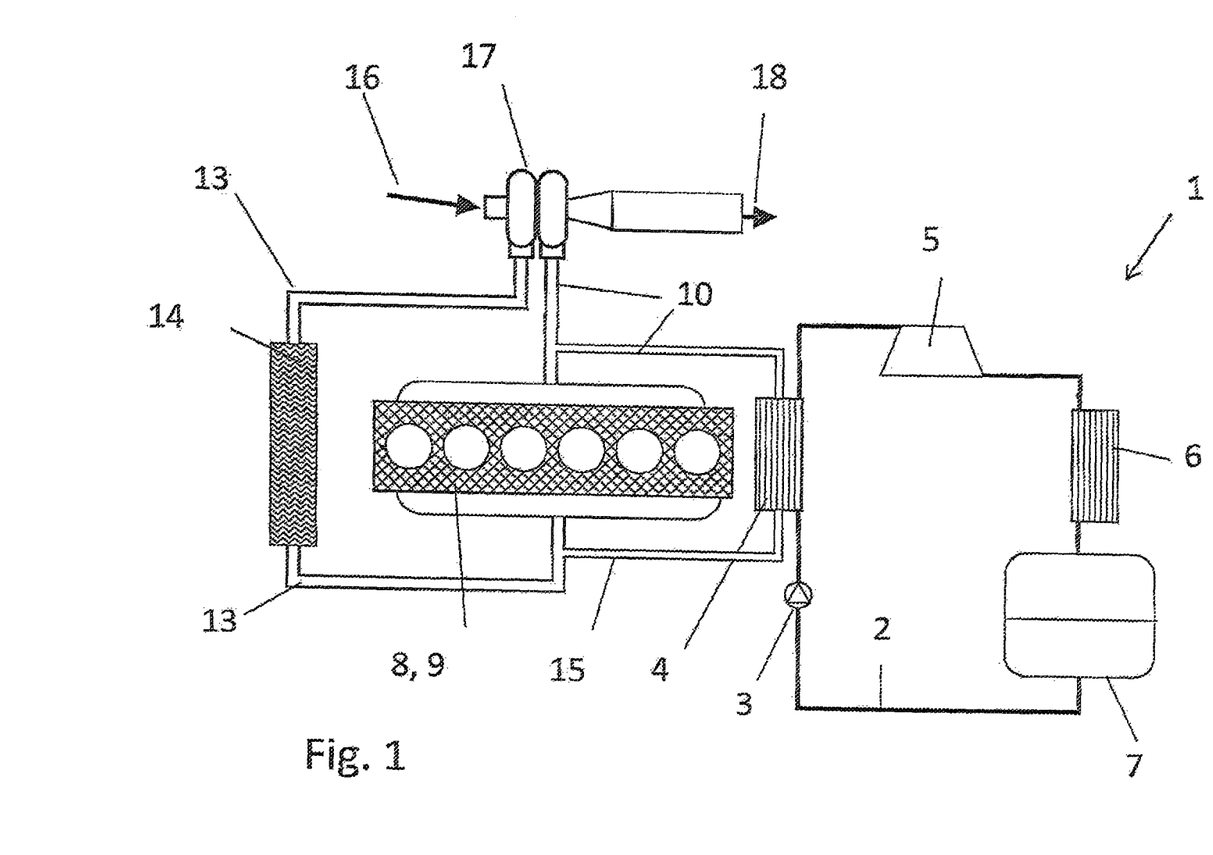
FIG. 1 is a highly simplified illustration of an internal combustion engine with a system for utilizing the waste heat of the internal combustion engine.

An internal combustion engine 8 as internal combustion reciprocating piston engine 9 is used to drive a motor vehicle, particularly a truck, and comprises a system 1 for utilizing the waste heat of internal combustion engine 8 by means of the Clausius-Rankine cycle process. Internal combustion engine 8 has an exhaust turbocharger 17. Exhaust turbocharger 17 compresses fresh air 16 in a charge air line 13 and a charge air cooler 14, built into charge air line 13, cools the charge air before it is supplied to internal combustion engine 8. A part of the exhaust gas is removed from internal combustion engine 8 through an exhaust gas line 10 and then cooled in an evaporator heat exchanger 4 and with an EGR line 15 mixed into the fresh air supplied to internal combustion engine 8 with charge air line 13. Another part of the exhaust gas is introduced into exhaust turbocharger 17 to drive exhaust turbocharger 17 and then given off as exhaust gas 18 into the environment. System 1 has lines 2 with a working medium. An expander 5, a condenser 6, a collecting and equalizing tank 7, and a pump 3 are integrated in the circuit with the working medium. The liquid working medium is raised to a higher pressure level in the circuit by pump 3 and then the liquid working medium is vaporized in evaporator heat exchanger 4 and then performs mechanical work in expander 5, in that the gaseous working medium expands and thereupon has a lower pressure. The gaseous working medium is liquefied in condenser 6 and then again supplied to collecting and equalizing tank 7.

Figure 2:
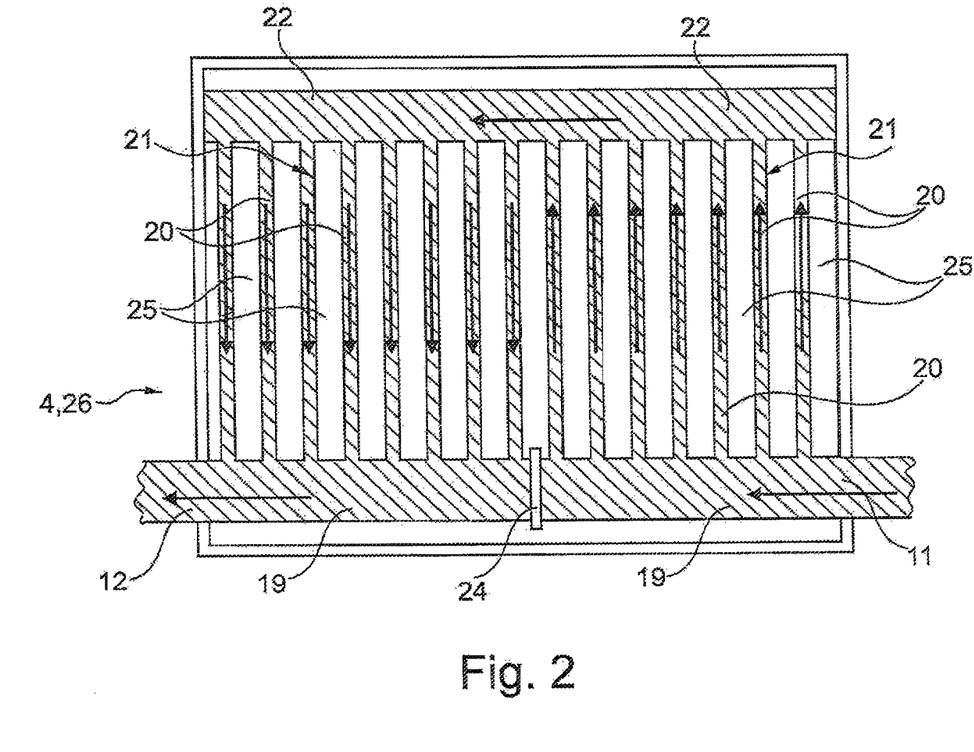
FIG. 2 is a section of an evaporator heat exchanger of a first exemplary embodiment.
Figure 3:
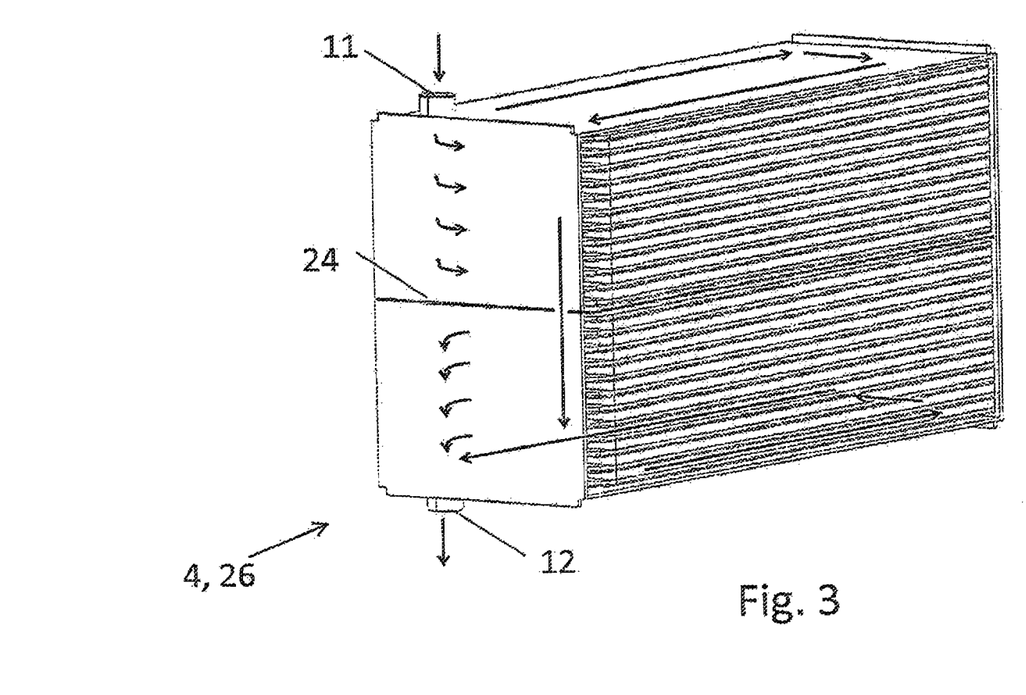
FIG. 3 is a perspective view of the evaporator heat exchanger according to FIG. 2.

A first exemplary embodiment of evaporator heat exchanger 4 is illustrated in FIGS. 2 and 3. In this regard, evaporator heat exchanger 4 is designed as only one unit 26 and has an inlet opening 11 for introducing the working medium, e.g., water, and an outlet opening 12 for discharging the working medium. Further, the exhaust gas is conveyed into evaporator heat exchanger 4 through inlet openings (not shown) for the exhaust gas, and the exhaust gas is again conveyed out from evaporator heat exchanger 4 through an outlet opening (not shown). The exhaust gas here is first conveyed into an exhaust gas flow duct and conveyed from the exhaust gas flow duct (not shown) through a plurality of exhaust gas flow duct parts 25, connected hydraulically in parallel (FIG. 2). The working medium after being conveyed through inlet opening 11 is conveyed into a flow duct 19 and from flow duct 19 the working medium flows through a plurality of flow duct parts 20 connected hydraulically in parallel. Said plurality of flow duct parts 20, connected hydraulically in parallel, here represent a parallel region 21 of evaporator heat exchanger 4. Flow duct 19 is bounded at inlet opening 11 by a partition plate 24. Because of partition plate 24, the working medium, conveyed through inlet opening 11, flows in flow duct 19 first through only one part of all flow duct parts 20 connected hydraulically in parallel. The first parallel region 21, through which the working medium flows after being conveyed through inlet opening 11 as the first region, is arranged in FIG. 2 to the right of partition plate 24.

After the working medium is conveyed through the flow duct parts, connected hydraulically in parallel, in first parallel region 21, the working medium again flows out of flow duct parts 20 and reaches a mixing duct 22. The working medium conveyed out of flow duct parts 20, connected hydraulically in parallel, is again mixed in mixing duct 22 and flows according to the illustration in FIG. 2 left to a second parallel region 21 of evaporator heat exchanger 4. The second parallel region 21 of evaporator heat exchanger 4 with a plurality of flow duct parts 20, connected hydraulically in parallel, is here arranged to the left of partition plate 24, according to the illustration in FIG. 2. The working medium thus flows out of mixing duct 22 into flow duct parts 20 of second parallel region 21 and after being conveyed through flow duct parts 20 of second parallel region 21, the working medium again flows into flow duct 19 at outlet opening 12. After being conveyed into flow duct 19 at outlet opening 12, the working medium is again conveyed in the gaseous state out of evaporator heat exchanger 4. The heat transfer, from the exhaust gas in exhaust gas flow duct parts 25 to the working medium, which flows through flow duct parts 20, occurs here substantially in both parallel regions 21. A different volume flow can occur in this case in exhaust gas flow duct parts 25, so that this is related to a different heating and vaporizing of the working medium in flow duct parts 20. A different vaporizing in particular also has the result that in a flow duct part 20 without vaporizing of the working medium no increase in the pressure loss occurs and thereby a substantially higher volume flow of working medium flows in those flow duct parts 20 without a transition from the liquid to the gaseous state than in those flow duct parts 20 in which the working medium has already been changed to the gaseous state. Because of the presence of mixing duct 22, after the working medium leaves flow duct parts 20 of first parallel region 21, the working medium is again mixed, so that thereby in mixing duct 22 during entry into second parallel region 21 there is a substantially homogeneous temperature distribution. As a result, nonuniformities in the heating and vaporizing of the working medium in first parallel region 21 can be substantially equalized, so that a substantially completely vaporized working medium leaves evaporator heat exchanger 4 from outlet opening 12. As a result, the efficiency of system 1 can be increased and the lifetime of expander 5 can also be improved in an advantageous manner.

Figure 4:
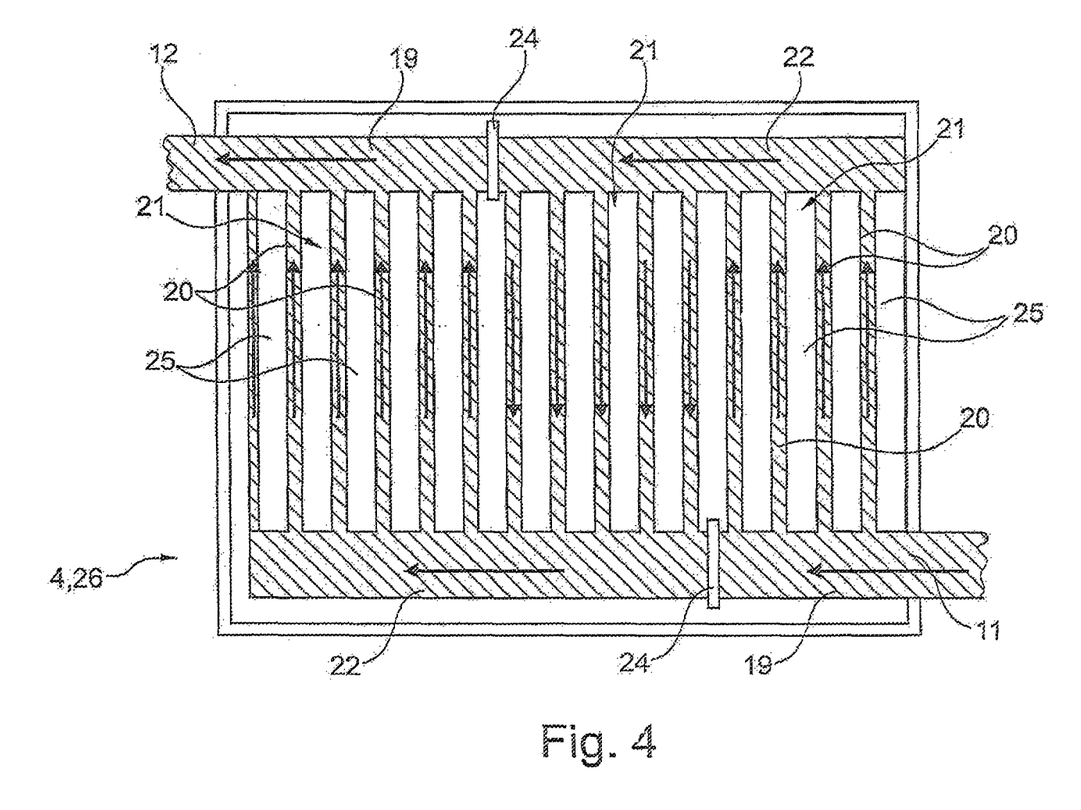
FIG. 4 is a section of the evaporator heat exchanger of a second exemplary embodiment.

A second exemplary embodiment of evaporator heat exchanger 4 is illustrated in FIG. 4. Substantially only the differences with respect to the first exemplary embodiment according to FIGS. 2 and 3 will be described below. Flow duct 19 is interrupted by two partition plates 24, so that as a result three parallel regions 21 form in evaporator heat exchanger 4. A first parallel region here according to the illustration in FIG. 4 is to the right of the bottom partition plate 24, a second parallel region 21 is arranged between partition plate 24 shown at the bottom in FIG. 4 and partition plate 24 shown at the top in FIG. 4, and the third parallel region 21 is to the left of partition plate 24 shown at the top in FIG. 4. Because of this flow guidance of the working medium in evaporator heat exchanger 4 in this second exemplary embodiment, the evaporator heat exchanger has two mixing ducts 22, in which mixing occurs with an associated homogeneous temperature distribution of the working medium after it leaves the plurality of flow duct parts 20. Thereby the homogeneous temperature distribution and the associated uniform evaporation of the working medium in flow duct parts 20 can be improved still further.

Figure 5:
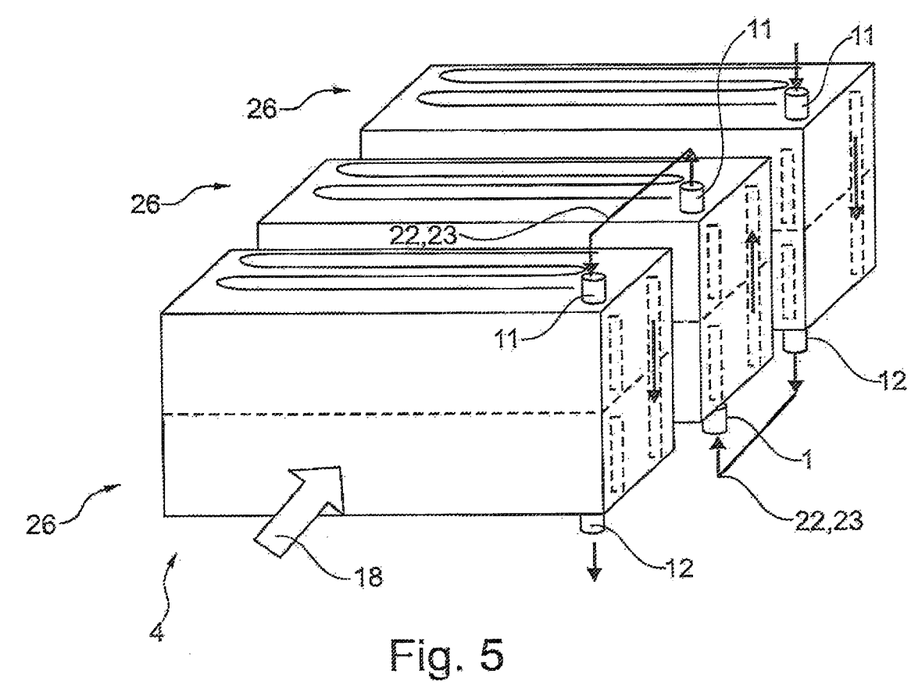
FIG. 5 is a perspective view of the evaporator heat exchanger in a third exemplary embodiment.

A third exemplary embodiment of evaporator heat exchanger 4 is illustrated in FIG. 5. Evaporator heat exchanger 4 in the third exemplary embodiment includes a total of three units 26. The three units 26 in this case have preferably separate housings and are thereby connected in series hydraulically relative to the working medium. The working medium is thus conveyed first to first unit 26 shown at the very back in FIG. 5, then the working medium is conveyed through a mixing duct 22, shown only with arrows in FIG. 5, as mixing tube 23 into second unit 26, shown in the center in FIG. 5, and then the working medium after being conveyed out of middle unit 26 is conveyed to third unit 26 shown frontmost in FIG. 5 and after being conveyed out of the frontmost unit 26 shown in FIG. 5, the working medium is supplied to expander 5 (not shown in FIG. 5). Exhaust gas 18 according to the illustration in FIG. 5 is thereby conveyed through the three units 26 and thereby flows first through the third, then the second, and finally the first unit 26 of evaporator heat exchanger 4. Each unit 26 of evaporator heat exchanger 4 has in each case a parallel region 21 with a plurality of flow duct parts 20 connected hydraulically in parallel (not shown).

Regarded overall, major advantages are associated with system 1 of the invention. Because of the mixing of the working medium in mixing duct 20 after being conveyed out of a plurality of flow duct parts 20 before being introduced into another plurality of flow duct parts 20 of evaporator heat exchanger 4, the working medium in evaporator heat exchanger 4 can be vaporized substantially completely and uniformly. The performance or the efficiency of system 1 increases as a result and the lifetime of expander 5 can be extended thereby in an advantageous manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for utilizing waste heat of an internal combustion engine via a Clausius-Rankine cycle process, the system comprising:
    a circuit having lines with a working medium;
    a pump configured to convey the working medium;
    an evaporator heat exchanger configured to vaporize the working medium with the waste heat of the internal combustion engine, the evaporator heat exchanger including a flow duct, an inlet opening for conveying the working medium into the flow duct and an outlet opening for conveying the working medium out of the flow duct, the flow duct being divided into a plurality of flow duct parts connectable in parallel hydraulically;
    an expander;
    a condenser configured to liquefy the vaporized working medium; and
    a collecting and equalizing tank for the liquid working medium;
    wherein the evaporator heat exchanger has a mixing duct,
    wherein, in a flow direction of the working medium, at least two flow duct parts, connectable hydraulically in parallel, open into the mixing duct, and
    wherein, in the flow direction of the working medium, the mixing duct opens into at least two flow duct parts connectable hydraulically in parallel.

2. The system according to claim 1, wherein the evaporator heat exchanger has at least two mixing ducts and at least two flow duct parts connectable hydraulically in parallel, that are arranged in the flow direction of the working medium hydraulically between the at least two mixing ducts hydraulically in series to the at least one mixing duct.

3. The system according to claim 1, wherein the evaporator heat exchanger comprises at least one exhaust gas flow duct or a plurality of exhaust gas flow ducts for conveying exhaust gas to give off heat from the exhaust gas to the working medium and/or wherein the evaporator heat exchanger is a plate heat exchanger, a spiral heat exchanger, a shell and tube heat exchanger, or a double-pipe heat exchanger, and/or wherein the exhaust gas and the working medium are guided in counterflow.

4. The system according to claim 1, wherein the working medium is water.

5. The system according to claim 1, wherein the evaporator heat exchanger has at least one parallel region with at least two flow duct parts connectable hydraulically in parallel.

6. The system according to claim 5, wherein the at least one parallel region has at least 2, 5, 10, 20, or 30 flow duct parts connectable hydraulically in parallel.

7. The system according to claim 5, wherein the evaporator heat exchanger comprises a plurality of separate units and at least one or only one parallel region is arranged in each unit, and wherein the units are interconnected hydraulically to the mixing duct.

8. The system according to claim 5, wherein the evaporator heat exchanger comprises only one unit and at least two parallel regions are arranged in the unit.

9. A method for operating a system for utilizing waste heat of an internal combustion engine via the Clausius-Rankine cycle process, the method comprising:
    conveying a working medium in a circuit through lines via a pump;
    vaporizing the working medium in an evaporator heat exchanger with the waste heat of the internal combustion engine;
    expanding the working medium in an expander and performing mechanical work;
    liquefying the vaporous working medium in a condenser;
    conveying the working medium into the evaporator heat exchanger by flowing the working medium through a flow duct and by conveying the working medium hydraulically downstream of the flow duct into at least two flow duct parts as a parallel region;
    conveying the working medium hydraulically in parallel through the at least two flow duct parts by conveying the working medium hydraulically downstream of the at least two flow duct parts into a mixing duct;
    mixing the working medium, conveyed out of the at least two flow duct parts, in the mixing duct;
    conveying, hydraulically downstream of the mixing duct, the working medium into at least two flow duct parts as a parallel region;
    conveying, hydraulically, the working medium in parallel through the at least two flow duct parts; and
    conveying, hydraulically, the working medium downstream of the at least two flow duct parts into the flow duct.

10. The method according to claim 9, wherein the working medium is conveyed through at least 3 parallel regions and conveyed hydraulically between the at least 3 parallel regions through a mixing duct and mixed so that the working medium is conveyed through at least 2 mixing ducts and mixed.

11. The method according to claim 9, wherein exhaust gas is conveyed to the at least one parallel region and thereby the heat is transferred from the exhaust gas to the working medium and wherein the exhaust gas is conveyed in the at least one parallel region through at least one exhaust gas flow duct or a plurality of exhaust gas flow duct parts.

12. An internal combustion engine, particularly an internal combustion reciprocating piston engine, with a system for utilizing waste heat of the internal combustion engine via the Clausius-Rankine cycle process, the engine comprising:
    a circuit having lines with a working medium;
    a pump for conveying the working medium;
    an evaporator heat exchanger configured to be heated by the waste heat of the internal combustion engine for vaporizing the working medium;
    an expander;
    a condenser for liquefying the vaporized working medium; and
    a collecting and equalizing tank for the liquid working medium, wherein
    the evaporator including a flow duct, an inlet opening for conveying the working medium into the flow duct and an outlet opening for conveying the working medium out of the flow duct,
    the flow duct is divided into at least first to fourth flow duct parts connectable in parallel hydraulically,
    the working medium conveyed through the inlet opening is distributed and conveyed through the first and second flow duct parts, and the working medium conveyed through the first and second flow duct parts is distributed and conveyed through the third and fourth flow duct parts, and a flow direction of the working medium through the first and second flow duct parts is opposite from a flow direction of the working medium through the third and fourth flow duct part.

13. The internal combustion engine according to claim 12, wherein the flow duct is further divided into fifth and sixth flow duct parts connectable in parallel and hydraulically with the first to fourth flow duct parts, the working medium conveyed through the third and fourth flow duct parts is distributed and conveyed through the fifth and sixth flow duct parts, and a flow direction of the working medium through the fifth and sixth flow duct parts is in the same direction as the flow direction of the working medium through the first and second flow duct parts.

* * * * *